United States Patent Office 2,819,943
Patented Jan. 14, 1958

2,819,943

PROCESS FOR DYEING OR PRINTING FIBERS OF POLYACRYLONITRILES

Paul Rhyner, Basel, Harald Stern, Neu Welt, near Basel, and Jacques Wegmann, Basel, Switzerland, assignors to Ciba Limited, Basel, Switzerland, a Swiss firm No Drawing. Application December 13, 1954
Serial No. 474,968

Claims priority, application Switzerland
December 18, 1953

10 Claims. (Cl. 8—55)

This invention is based on the observation that polyacrylonitrile fibers can be dyed or printed in an advantageous manner by using as dyestuffs 2':4'-diamino-1:1'-azobenzenes which are free from acid groups imparting solubility in water and contain a tertiary amino group in the 4-position.

The fibers of polyacrylonitriles serving as starting materials in the present process may be made, for example, from polyacrylonitrile alone or from a copolymer of a substantial proportion of acrylonitrile and other polymerizable substances, or they may be composed of a mixture of polymers, which mixture contains a substantial proportion of acrylonitrile polymer.

The 2':4'-diamino-1:1'-azobenzenes used as dyestuffs contain in the 4-position a tertiary amino group, for example, a dialkylamino group containing two alkyl radicals of low molecular weight which may be identical or different, and at least one or both of the alkyl radicals may contain a hydroxyl, methoxy or cyano group. The azobenzenes used as dyestuffs also contain an amino group in each of the 2'- and 4'- positions, and it is generally of advantage that primary amino groups should be present in these positions. Further substituents, for example, alkyl or alkoxy groups of low molecular weight, may be present in one or both of the benzene nuclei of the azobenzenes.

Accordingly, it is generally desirable to use azobenzenes substituted by amino groups in the manner stated above, in which the benzene radicals substituted in the 4-position by a tertiary amino group corresponds to the formula

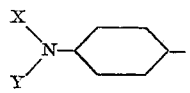

in which X and Y each represent an alkyl group of low molecular weight, or in which azobenzenes the benzene radicals substituted in the 2'- and 4'- positions by amino groups correspond to the formula

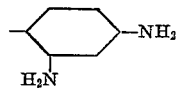

and especially advantageous are azobenzenes which fulfil both of these requirements and therefore correspond to the formula

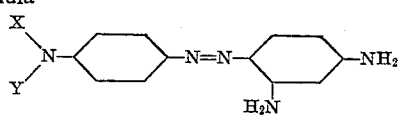

in which X and Y have the meanings given above.

Some of the azobenzenes used in the present process are known, and these compounds can generally be made by methods in themselves known, for example, by coupling a diazotized 1-aminobenzene, which contains in the 4-position a tertiary amino group, with a 1:3-diaminobenzene.

In dyeing by the process of this invention it is of advantage to fix the dyestuffs of the above constitution in the form of their salts on the polyacrylonitrile fibers. These salts, in which the dyestuffs constitute the basic radical, may contain any desired acid radicals, for example, the radical of an inorganic or organic monobasic, dibasic or polybasic acid. As examples there may be mentioned the following acids: Inorganic acids such as hydrochloric acid, hydrobromic acid, sulfuric acid, phosphoric acid, amino-sulfonic acid, perchloric acid; and organic sulfonic acids, such as methane sulfonic acid, benzene monosulfonic acid, benzene disulfonic acids, naphthalene-1- or -2-sulfonic acid, naphthalene disulfonic acids, cymene sulfonic acids; carboxylic acids such as formic acid, acetic acid, propionic acid, chloracetic acid, oxalic acid, lactic acid, tartaric acid, citric acid, gluconic acid (if desired in the form of its lactone), glutamic acid, ethylene diamino-tetracetic acid, benzoic acid, 4-tertiary-butyl-benzoic acid, naphthoic acid, salicylic acid and phthalic acid.

The process of the invention can be carried out in the following three ways:

A. Dyeing may be carried out with the use of salts of the dyestuffs defined above or with mixtures of the bases and acids forming such salts.

B. Polyacrylonitrile fibers are dyed with dyestuff bases as defined above and the dyeings are subsequently treated with acid.

C. Polyacrylonitrile fibers are treated with acid and then dyed with a dyestuff base as defined above.

It is usually of advantage to carry out the dyeing with the dyestuff bases or dyestuff salts, and also the pretreatment or after-treatment with acid, in an aqueous medium. In some cases the dyestuff salts possess a fairly good to good solubility in water, so that they can be used for dyeing from aqueous solution. This is not usually the case with the free bases, and the latter can be applied by the dispersion dyeing process customary for dyeing cellulose acetate artificial silk or nylon, in which process the dyestuff is dispersed with the aid of a suitable dispersing agent, for example, a soap, sulfite cellulose waste liquor, a fatty alcohol sulfonate, a higher alkyl sulfonic acid, a benzimidazole sulfonic acid containing an alkyl radical of high molecular weight in the μ-position of the imidazole radical, a condensation product of an alcohol of high molecular weight with ethylene oxide or another substance having a similar action, and using the dyestuff in this dispersed form for dyeing.

In the method A referred to above, for example, the finished salt may be dissolved or dispersed in the necessary quantity of water before dyeing, or the free base may be converted in the dyebath before dyeing into a salt thereof by the addition of an acid. In may be of advantage to use an excess of the acid. When the dyestuff salt hydrolyzes to an appreciable extent in the dyebath and the dyestuff base or the acid or both is or are only slightly soluble in water, it may happen that these substances do not completely dissolve. In such cases it may be of advantage to add one of the dispersing agents mentioned above. Generally this behaviour of the dyestuffs and acids is not disadvantageous, because the dyestuff is fixed on the fiber as such or in the form of a salt thereof, and owing to the maintenance of the equilibrium between hydrolyzed and non-hydrolyzed dyestuff salt in the aqueous medium the undissolved constitutents gradually dissolve until finally the dyebath has been exhausted substantially completely or to a great extent.

In the after-treatment of a dyeing with acid by method B referred to above it is also generally of advantage to use an excess of acid.

This applies also to the pretreatment with acid in method C. In this case there are considerable differences in the quantities of the acids which can be fixed by a given quantity of polyacrylonitrile fibers in the absence of dyestuff, depending on the nature of the acid used, so that the range of application of this method is somewhat restricted, as compared with that of methods A and B. Good results are in general obtained with organic acids.

In order to obtain by the present process dyeings which are distinguished by especially favourable properties, for example, by especially good properties of fastness, an additional treatment is in general desirable. In this connection treatment with an oxidizing agent or with an aldehyde or an agent yielding an aldehyde is especially useful. It may be stated quite generally that such a treatment is advantageously coupled with the dyeing method described above in which the dyestuff is fixed in the form of a salt thereof on the polyacrylonirile fibers.

As oxidizing agents there may be used with advantage, for example, alkali bichromates such as potassium bichromate or sodium bichromate, and the treatment with the oxidizing agent may be supplemented by further additions, for example, salts of thiocyanic acid, and especially ammonium thiocyanate. It is usually of advantage to carry out the treatment in an acid medium, for example, a sulfuric acid medium, and at a raised temperature. Thus, for example, favorable results are obtained by dyeing polyacrylonitrile fibers with a salt of a dyestuff having the constitution defined above, and subsequently treating the dyeing, advantageously in a fresh bath, with an alkali bichromate in an acid medium and in the presence of ammonium thiocyanate.

For the treatment with an aldehyde or an agent yielding aldehyde there are especially suitable aliphatic aldehydes of low molecular weight, such as acetaldehyde, glyoxal or above all formaldehyde, or an agent yielding such an aldehyde. Among agents yielding formaldehyde there may be mentioned more especially the nitrogenous formaldehyde condensation products such, for example, as hexamethylene tetramine, monomethylol-urea, hexamethylol-triaminotriazine or a precondensate of formaldehyde and dicyandiamidine.

The treatment with an aldehyde or an agent yielding an aldehyde may, for example, be carried out by first dyeing the polyacrylonitrile fibers with a dyestuff base or dyestuff salt of the kind defined above, and then subjecting the dyeing, advantageously in a fresh bath, to an after-treatment with an aldehyde or an agent yielding an aldehyde in an acid medium, or by subjecting the dyeing to the vapour of an aldehyde.

Alternatively, the polyacrylonitrile fibers may be dyed in a single operation in an acid medium in the presence of an aldehyde or an agent yielding an aldehyde with the dyestuff of the constitution defined above. In this case, instead of adding the dyestuff and the agent yielding aldehyde separately to the dyebath the two substances may be mixed together previously, if desired with the addition of a further substance such, for example as a dispersing agent or a hydrotropic agent such as urea. In this manner valuable dyestuff preparations can be made. Especially valuable are those preparations which contain a nitrogen-containing condensation product of formaldehyde and a 2':4'-diamino-1:1'-azobenzene free from groups imparting solubility, which contains in the 4-position a tertiary amino group.

Furthermore, the dyestuff may be reacted, advantageously in an acid medium, with an aldehyde of low molecular weight, especially formaldehyde, to form a condensation product, which is subsequently used for dyeing polyacrylonitrile fibers.

As in the case of the treatment with an oxidizing agent, the treatment with the aldehyde or agent yielding aldehyde, or the dyeing operation in the presence of such a substance, is advantageously carried out at a raised temperature, for example, at or in the vicinity of the boiling temperature of the dyebath. If desired, the treatment of the dyeing may be carried out in a closed vessel at a temperature exceeding 100° C.

The process of this invention is especially suitable for producing dark tints. In this case there are especially valuable owing to their good fastness to light, washing and sublimation those dyeings produced in the manner described above, which have also been treated with an oxidizing agent or subjected to the action of an aldehyde, and which, for example, have navy blue to black tints.

The following examples illustrate the invention, the parts and percentages being by weight:

Example 1

By diazotizing 1-amino-4-dimethylaminobenzene hydrochloride and coupling the diazo compound with 1:3-diaminobenzene there is obtained in the usual manner the monoazo-dyestuff of the formula

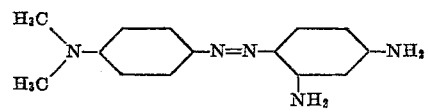

and the dyestuff is precipitated by the addition of sodium acetate at a pH value of 5.2.

The dyestuff is filtered off, and the press cake is wet ground with a solution of sulfite cellulose waste liquor, of which the content of solid is equal to the weight of the dyestuff, and the mixture is spray-dried.

10 parts of the mixture so obtained are mixed with 5 parts of sodium acetate, then stirred with 100 parts of a solution of 10 percent strength of a condensation product from 1 mol of cetyl alcohol and 20 mols of ethylene oxide, and 900 parts of hot water are added.

The 1015 parts of mixture so obtained are added to a dyebath consisting of 3000 parts of hot water which contains 5 parts of acetic acid of 40 percent strength. 100 parts of boiled yarn of polyacrylonitrile staple fibers are entered at 60° C., the temperature is raised to 100° C. in the course of ½ hour, and boiling is carried on for 1½ hours.

The dyeing is then rinsed and after-treated for ½ hour at 100° C. in a bath which contains, per liter, 2 grams of potassium bichromate, 2 grams of ammonium thiocyanate and 5 cc. of concentrated sulfuric acid. The dyeing is rinsed, soaped for 10 minutes at 60° C., dried, and there is obtained a full black tint which is fast to washing, chlorine and light.

By using, instead of the aforesaid dyestuff, the same quantity of the dyestuff of the formula

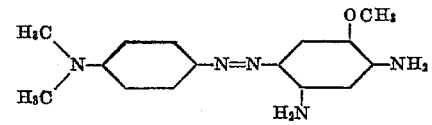

there is obtained a blue-black dyeing having similar good properties.

A neutral black dyeing is obtained with the dyestuff of the formula

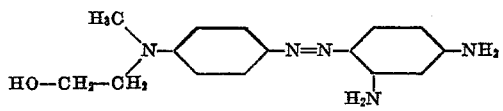

Example 2

The dyestuff mentioned in the first paragraph of Example 1 is precipitated in the form of the free base by the addition of sodium hydroxide, then stirred with concentrated hydrochloric acid, and the whole is evaporated to dryness. 5 parts of the dyestuff so treated are dissolved in 100 parts of water, and added to a dyebath consisting of 3000 parts of water which contains 20 parts of crystalline sodium sulfate. 100 parts of boiled yarn of polyacrylonitrile staple fibers are entered at 60° C., and the temperature is raised to 100° C. in the course of ½ hour. After boiling for a further 1½ hours, the material is rinsed and after-treated in the manner described in Example 1. In this manner a full black dyeing is produced.

If, instead of this after-treatment, the material is after-treated for ½ hour at 100° C. in a bath which contains, per liter, 2 cc. of formaldehyde solution of 30 percent strength and 4 cc. of acetic acid of 40 percent strength, there is also obtained a black dyeing which is fast to washing, chlorine and light.

If the same dyeing operation is carried out with only 1 part of dyestuff, there is obtained a navy blue dyeing having similar good properties and an especially high fastness to light.

By adding to the latter dyebath at the outset 5 parts of formaldehyde solution of 30 percent strength, there is obtained by direct dyeing, without after-treatment, a similar good navy blue dyeing.

By using in the after-treatment, instead of formaldehyde, the same amount of glyoxal, there is obtained a somewhat more reddish navy blue dyeing.

*Example 3*

10 parts of the dyestuff mentioned in Example 2 are mixed with 2 parts of hexamethylene tetramine and 8 parts of urea. 5 parts of the resulting dyestuff preparation are covered with 2.5 parts of concentrated formic acid and dissolved in 100 parts of water. The resulting solution is added to 3900 parts of water, 20 parts of crystalline sodium sulfate are added, and 100 parts of boiled yarn of polyacrylonitrile staple fibers are entered at 60° C. The temperature of the bath is raised to 100° C. in the course of ½ hour and boiling is continued for a further 1½ hours. The material is then rinsed and soaped, and there is obtained a navy blue dyeing having excellent properties of fastness.

By using, instead of hexamethylene tetramine, the same quantity of monomethylol urea, hexamethyloltriaminotriazine or a precondensate of formaldehyde and dicyandiamidine, similar good results are obtained.

By using, instead of the aforesaid dyestuff, the same quantity of the dyestuff mentioned in the third paragraph of Example 1 there is obtained a powerful strong neutral grey dyeing.

*Example 4*

The dyestuff mentioned in the first paragraph of Example 1, is precipitated with sodium hydroxide and pasted and dried as described in Example 1. 5 parts of the dyestuff are stirred with 100 parts of a solution of 10 percent strength of a condensation product of 1 mol of cetyl alcohol and 20 mols of ethylene oxide, and the mixture is added to 3900 parts of water at 60° C. 100 parts of boiled yarn of polyacrylonitrile staple fibers are entered, and the temperature is raised to 100° C. in the course of ½ hour, and boiling is continued for a further 1½ hours. The material is then rinsed, after-treated for ½ hour at 100° C. in a bath which contains, per liter, 2 cc. of formaldehyde solution of 30 percent strength and 40 cc. of acetic acid of 80 percent strength, and the material is then soaped for 10 minutes at 60° C. There is obtained a navy blue tint having excellent properties of fastness.

By dyeing in the manner described above 100 parts of continuous threads consisting of polyacrylonitrile filaments, there is obtained a blue-grey tint likewise having excellent properties of fastness.

*Example 5*

The dyestuff mentioned in the first paragraph of Example 1 is precipitated in the form of the free base by the addition of sodium hydroxide, then stirred with concentrated hydrochloric acid and an aqueous solution of formaldehyde, and the mixture is evaporated to dryness. 1 part of the resulting product is mixed with 1 part of sulfite cellulose waste liquor and finely ground. The dyestuff is then pasted with 20 parts of a solution of 10 percent strength of a condensation product from 1 mol of cetyl alcohol and 20 mols of ethylene oxide. The mixture is diluted with 80 parts of hot water and the resulting stock solution is added to a dyebath consisting of 3900 parts of water containing 5 parts of acetic acid of 40 percent strength. 100 parts of yarn of polyacrylonitrile fibers are then dyed in the manner described in Example 3, and there is obtained a navy blue tint having excellent properties of fastness.

What is claimed is:

1. A process for coloring fibers of polyacrylonitriles, which comprises the step of dyeing the fibers with a member selected from the group consisting of dyestuffs corresponding to the formula

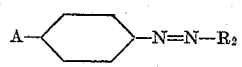

in which A represents a tertiary amino group and $R_2$ represents a benzene radical substituted by $H_2N$-groups in an ortho-position and the para-position to the azo group, and of salts of the said dyestuffs with acids, said dyestuffs being free from further groups imparting solubility in water, and also the step of subjecting the fibers to the action of a member selected from the group consisting of an aliphatic aldehyde of low molecular weight and an agent yielding such an aldehyde.

2. A process for coloring fibers of polyacrylonitriles, which comprises dyeing said fibers in an aqueous bath with a dyestuff of the formula

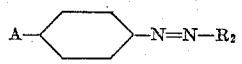

in which A represents a tertiary amino group and $R_2$ represents a benzene radical substituted by $H_2N$-groups in an ortho-position and the para-position to the azo group, which dyestuff is free from further groups imparting solubility in water, and treating the fibers with an aliphatic aldehyde of low molecular weight.

3. A process for coloring fibers of polyacrylonitriles, which comprises dyeing said fibers in an aqueous bath with a salt of a dyestuff of the formula

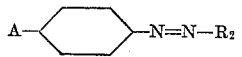

in which A represents a tertiary amino group and $R_2$ represents a benzene radical substituted by $H_2N$-groups in an ortho-position and the para-position to the azo group, which dyestuff is free from further groups imparting solubility in water, and treating the fibers in an acid medium with formaldehyde.

4. A process for coloring fibers of polyacrylonitriles, which comprises dyeing said fibers in an aqueous bath with a salt of a dyestuff of the formula

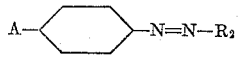

in which A represents a tertiary amino group and $R_2$ represents a benzene radical substituted by $H_2N$-groups in an ortho-position and the para-position to the azo group, which dyestuff is free from further groups imparting solubility in water, and treating the fibers in an acid medium with an agent yielding formaldehyde.

5. A process for coloring fibers of polyacrylonitriles, which comprises dyeing said fibers in the presence of an agent yielding formaldehyde and in an aqueous acid bath with a salt of a dyestuff of the formula

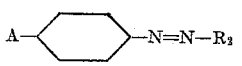

in which A represents a tertiary amino group and $R_2$ represents a benzene radical substituted by H₂N-groups in an ortho-position and the para-position to the azo group, which dyestuff is free from further groups imparting solubility in water.

6. A process for coloring fibers of polyacrylonitriles, which comprises dyeing said fibers in an aqueous bath with a salt of a dyestuff of the formula

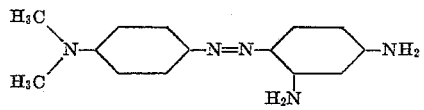

and treating the fibers in an acid medium with formaldehyde.

7. A process for coloring fibers of polyacrylonitriles, which comprises dyeing said fibers in the presence of an agent yielding formaldehyde and in an aqueous acid bath with a salt of the dyestuff of the formula

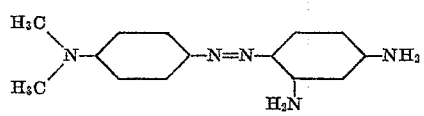

8. A dyestuff preparation which contains a dyestuff of the formula

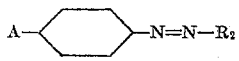

in which A represents a tertiary amino group and $R_2$ represents a benzene radical substituted by H₂N-groups in an ortho-position and in the para-position to the azo group, which dyestuff is free from further groups imparting solubility in water, and which preparation also contains an agent yielding an aldehyde.

9. A dyestuff preparation which contains a dyestuff of the formula

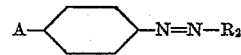

in which A represents a tertiary amino group and $R_2$ represents a benzene radical substituted by H₂N-groups in an ortho-position and in the para-position to the azo group, which dyestuff is free from further groups imparting solubility in water, and which preparation also contains an agent yielding formaldehyde.

10. A dyestuff preparation which contains as dyestuff a salt of a dyestuff of the formula

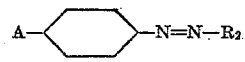

in which A represents a tertiary amino group and $R_2$ represents a benzene radical substituted by H₂N-groups in an ortho-position and in the para-position to the azo group, which dyestuff is free from further groups imparting solubility in water, and which preparation also contains an agent yielding an aldehyde.

References Cited in the file of this patent
UNITED STATES PATENTS 2,416,884    Schreiber _____ Mar. 4, 1947

FOREIGN PATENTS 190,313    Great Britain _____ Dec. 21, 1922
905,038    France _____ Mar. 26, 1945
854,339    Germany _____ Nov. 4, 1952

OTHER REFERENCES

Venkataraman, K. "The Chemistry of Synthetic Dyes," vol. 1, p. 295, Academic Press Inc. N. Y. (1952).

British Rayon and Silk Journal for July 1951, page 62.